United States Patent
Baron et al.

(12) 
(10) Patent No.: US 7,312,905 B2
(45) Date of Patent: Dec. 25, 2007

(54) METHOD FOR SCANNER LAMP WARM-UP OPTIMIZATION

(75) Inventors: John M. Baron, Longmont, CO (US); Heather N. Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1025 days.

(21) Appl. No.: 10/272,139

(22) Filed: Oct. 15, 2002

(65) Prior Publication Data

US 2004/0070799 A1    Apr. 15, 2004

(51) Int. Cl.
*H04N 1/04*   (2006.01)
*G03F 3/10*   (2006.01)

(52) U.S. Cl. .................... 358/475; 358/474; 358/497; 358/527

(58) Field of Classification Search ............... 358/497, 358/494, 471, 486, 409, 412, 401, 501, 505, 358/488, 527; 250/234–236; 318/685, 696; 382/318, 319, 312
See application file for complete search history.

(56) References Cited

U.S. PATENT DOCUMENTS

| 6,747,765 B2 * | 6/2004 | Kitamura et al. ........... 358/497 |
| 6,927,882 B2 | 8/2005 | Liang |

FOREIGN PATENT DOCUMENTS

| EP | 0905969 | 3/1999 |
| EP | 0905969 A2 | 4/2001 |
| JP | 58-219545 | 12/1983 |
| JP | 2001-068291 | 3/2001 |
| JP | 2001230910 | 8/2001 |
| JP | 2001230910 A | 8/2001 |

OTHER PUBLICATIONS

GB Search Report, Aug. 5, 2004.

* cited by examiner

*Primary Examiner*—Cheukfan Lee

(57) ABSTRACT

A scanning method that provides a quick start to the first scan and maintains the quality level of the final scan is disclosed. The first scan, or preview scan, is done without waiting for the lamp to stabilize. The time between the preview scan and the final high quality scan is used to stabilize the lamp.

17 Claims, 3 Drawing Sheets

METHOD FOR SCANNER LAMP WARM-UP OPTIMIZATION

FIELD OF THE INVENTION

The field of this invention relates to digital scanners and more specifically to a digital scanner that optimizes the lamp warm-up time after a preview scan.

BACKGROUND OF THE INVENTION

Electronic document scanners and facsimile machines transform an optical image of a document into an electric signal suitable for storing, displaying, printing or electronic transmission. These devices typically use illumination and optical systems to illuminate the object and focus a small area of the illuminated object, usually referred to as the "scan line", onto an optical photo sensor array. This direction is typically called the scan width or X-direction. The entire object is then scanned by sweeping the illuminated scan line across the entire object, either by moving the object with respect to the illumination and optical assemblies, or by moving the illumination and optical assemblies relative to the object. This is typically called the scan length or Y-direction.

An optical scanner has a native or optical resolution that is the maximum sample rate of the object to be scanned. In a typical scanner this resolution is usually 600 or 1200 samples or pixels per inch (ppi). Typically a scanner can scan at a range of resolutions or sample rates ranging from a small fraction (1/20) of the optical resolution up to 2 times the optical resolution. For example a scanner with an optical resolution of 600 ppi could scan using a resolution ranging from 30 ppi up to 1200 ppi.

Images that scanners scan range in size from small objects or photos up to scans of full pages. Typically scanners allow the size of the scanned area or window to be adjusted to match the size of the object to be scanned. A typical scanner allows the window to be adjusted in the x and y directions from one pixel in length up to the full size of the scanning bed. Many scanners allow the user to select or adjust the scan area by doing a low-resolution scan and displaying the results on a computer monitor. The user can then use the mouse to select the scan area for the final scan. Once the final scan area has been selected, a final high-resolution scan is done and saved in computer memory or on the hard disk. The low-resolution scan may be referred to as a preview scan.

The illumination system in most scanners contains a lamp. The type of lamp for many scanners is a fluorescent bulb. Fluorescent bulbs are well suited for scanners in a number of ways: they are relatively energy efficient, they have a wide variety of phosphors available to allow proper color balance, and they have relatively long life. Fluorescent bulbs do have some disadvantages. One disadvantage is the time it takes a fluorescent bulb to warm up and produce a relatively constant light profile along the length of the bulb. Scanners solve this problem in a number of ways. Some scanners never turn the lamp off. This allows quick scan starts but reduces the useful life of the scanner and wastes energy. Other scanners turn the light on just before a scan and then wait until the bulb has stabilized before beginning the scan. This method uses less energy but the user must wait longer for the lamp to start. Some scanners just turn the light on and scan before the light has stabilized. This allows a quick scan start but typically results in intensity variations over the scan area resulting in a poor quality scan.

There is a need for a scanning solution that starts the first scan quickly and retains high quality for the final scan.

SUMMARY OF THE INVENTION

A scanning system that provides a quick start to the first scan and maintains the quality level of the final scan is disclosed. The first scan, or preview scan, is done without waiting for the lamp to stabilize. The time between the preview scan and the final high quality scan, when the user is selecting the scan area, is used to stabilize the lamp.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
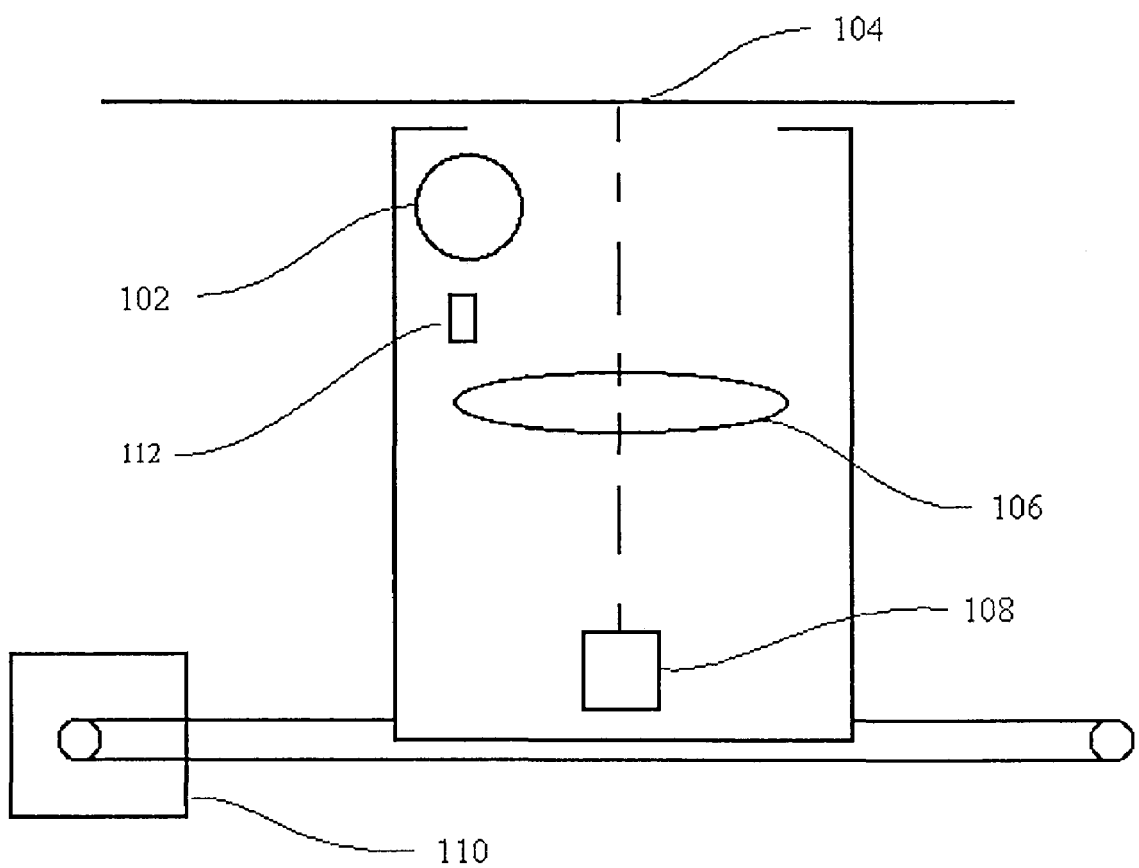
FIG. 1 is a block diagram of a digital imaging system.

A typical scanning system has a lamp (102) that illuminates a scan area (104). A lens (106) is used to focus the scan area onto a photo sensor (108) (typically a CCD). Mirrors (not shown) may be used to fold the optical path into a smaller space. A motor (110) is used to move the lamp, lens, and CCD relative to the item to be scanned. A processor (not shown) is used to control the functions of the scanner. For example, turn on and control the lamp, control the movement of the motor, and communicate with a host computer (not shown). The scanner may have a digital signal processor (not shown) (DSP) or application specific integrated circuit (ASIC) to manipulate the image data during a scan.

Some scanners use lamp types that only require a constant energy input to produce a constant amount of light, for example a xenon lamp. Other lamp types have lamp intensities that vary with temperature, for example fluorescent lamps. Typically these types of lamps require a control system that maintains the lamp brightness by varying the energy input into the lamp. The control system measures the lamp brightness and adjusts the power to the lamp to maintain a predetermined intensity level.

Some scanners have white strips running along the scan bed underneath the scanner lid. The CCD is designed such that it can scan the white strip during the scan. The control system uses this white strip to measure the reflected intensity of the lamp during the scan. The scanner may also have a white strip along the top of the scanner underneath the lid. This white strip may be used to help calibrate the CCD and measure the intensity profile of the lamp along the length of the lamp. Other scanners may have photo sensors (112) in addition to the main CCD, directed at the lamp to measure the lamp intensity. These additional photo sensors may be positioned at a number of locations along the lamp length. The advantage of having additional photo sensors along the lamp length is that the intensity profile along the lamp can be measured during a scan.

Figure 2:
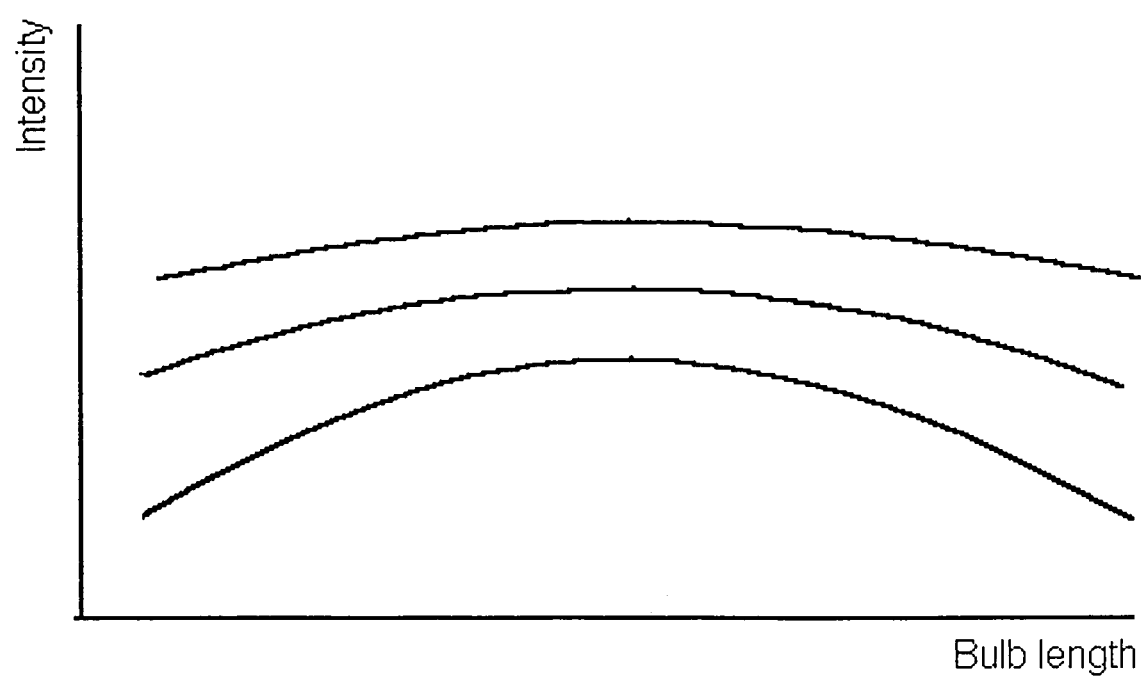
FIG. 2 is a graph of the intensity profile along the length of a bulb at 3 different temperatures.
Figure 3:
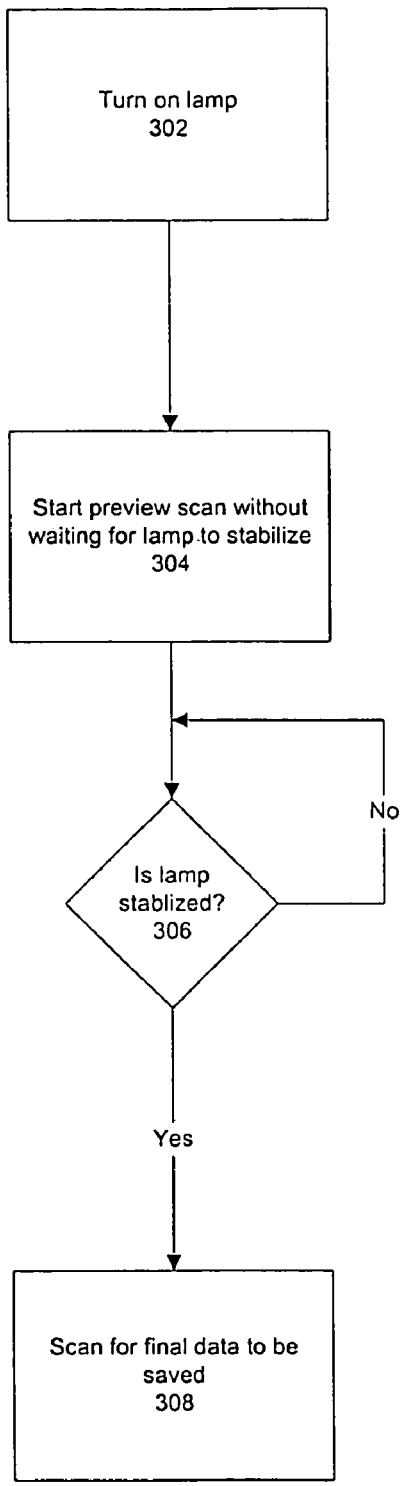
FIG. 3 is a flow chart for scanning in an example embodiment of the present invention.

Lamps that have intensity variations with temperature typically require some time to warm up before they produce a relatively constant light output. These types of lamps, when started from a cold state, change their intensity in two ways. First the overall intensity of the lamp increases as the lamp warms up. Once the lamp is producing the minimum amount of light required for a scan, the change in brightness can be controlled by the control system by reducing the power to the lamp. The second change is a fairly rapid change of the intensity profile along the length of the bulb (See FIG. 2). Typically the center of the bulb is initially much brighter than the ends of the bulb. As the bulb warms up, the overall brightness increases and the difference between the center and the ends of the bulb decreases. This change in intensity profile cannot be controlled by the control system. Currently, many scanners turn the lamp on and allow the lamp to reach a stable condition before starting a scan.

There are a number of methods that can be used to determine the stability of the lamp. One of the simplest is to wait a predetermined time. This method works well when the bulb is cold. However, when a number of scans have just been completed and the bulb is warm, this method may delay the start of a scan when the bulb may already be stable. Another method servos the lamp intensity by measuring the brightness at one place (typically one end of the bulb) and then measures the rate of change of the lamp power for the servoed intensity. Once the rate of change for the power has gone below a threshold, the lamp is considered stable. Another method measures the intensity profile between the center of the bulb and the edges of the bulb. When the difference between the center intensity and the edge intensities falls below a threshold, the lamp is considered stable. Once the lamp is stable, the scanner starts the scan. When the scan has been completed, some scanners turn the lamp off. When a new scan is requested, the scanner starts its lamp warm-up and stabilization the same way as the previous scan. Some scanners leave the light on for a predetermined time after each scan, for example 10 minutes. Using this method, a user will not need to wait for the lamp to warm-up if another scan is done within the predetermined time.

In many scanners the first scan performed is a low-resolution scan of the full scanner bed. This first low-resolution scan may be called a preview scan. The results of this scan are displayed so that the user may select the area of interest to be saved. Once the user has selected the area of interest, a second higher-resolution scan may be performed and the data from the second scan is saved as the scanned image. The data from the preview scan is typically used only for display purposes and is not permanently saved. Because the preview scan is not saved the lamp may not need to be as stable compared to a final scan.

Some scanners use the preview image for more than just area selection for the final scan. Some scanners allow the user to modify the color or contrast of a preview image. The scanning system then uses the information from the modifications to make adjustments to the scanner before performing the final scan. In these cases the appearance of the preview image may be more important than when the preview image is just used to determine the location of the final scan.

Today, scanners typically use the same lamp stabilization method for all scans. The lamp stabilization method is typically designed to produce a lamp stable enough for a scan where the data is being saved. Because the same lamp stabilization method is used for the preview scan, the user may wait longer than required for the start of the preview scan.

In one example embodiment of the current invention, the scanner would not wait for the lamp to reach its stabilized state before starting a preview scan. The scanner would turn on the lamp (302), and when the brightness of the lamp reached a minimum level, the scanner would perform a preview scan (304). After the end of the preview scan the scanner would keep the lamp running. The results of the preview scan would be displayed to allow the user to select a scan area. During the time that the preview image has been displayed and the user is making the selection for the scan area, the scanner is allowing the lamp to reach stabilization. Once the lamp is in the stabilized state, the scanner could perform a second scan (308). In this example embodiment, the scanner could include the time during the return of the scan mechanism to its home position as part of the lamp stabilization time.

In another example embodiment of the current invention, the scanner would do the preview scan before the lamp was fully stabilized. The preview image would be corrected for light variations during the scan and then displayed to the user. When the user selected a scan area and initiated a second scan, the scanner would start the second scan only when the light had reached a stable condition. In one embodiment the preview image would be corrected in the Y direction on a line-by-line bases. For example, the intensity of each scan line could be adjusted up or down dependent on the measured lamp intensity during the scanning of the corresponding scan line.

In another example embodiment of the current invention, the preview image would be corrected in the X-direction. This correction would compensate for intensity variations along the length of the bulb. The corrections may be based on measured changes or predicted changes. When the scanner has the ability to measure the lamp intensity along the length of the bulb during a scan, the scanner can use the measured profiles to correct each scan line of the preview image. When the scanner is unable to measure the lamp profile during a scan, the corrections to the preview image can be made based on modeling the profile changes in the bulb. Just before the scan starts, the intensity profile of the bulb may be measured. This establishes where in the model the lamp profile starts. The time each scan line of the preview scan is exposed can be determined. Using this information the predicted profile of the lamp intensity can be calculated for each preview scan line. Each preview scan line can then be corrected for the intensity variations in the bulb during the preview scan.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of scanning, comprising:
    turning on a lamp;
    scanning a first time to produce a preview image, where the first scan is begun before the lamp is stabilized;
    displaying the preview image;
    allowing the lamp to stabilize;
    after displaying the preview image and allowing the lamp to stabilize, scanning a second time.

2. The method of claim 1 where the lamp is stabilized by allowing a minimum time to pass.

3. The method of claim 2 where the minimum time to stabilize the lamp includes the time involved for the first scan.

4. The method of claim 1 where the lamp is considered stabilized when the power to the lamp needed to produce a predetermined light output level changes less than a threshold amount over a given time.

5. The method of claim 1 where the lamp is considered stabilized when the intensity profile of the lamp along the lamp axis changes less than a threshold amount over a given time.

6. The method of claim 1 where the lamp is powered at a fixed level during the first scan.

7. The method of claim 6 where the lamp intensity is controlled using a servo system during the second scan.

8. The method of claim 1 where first scan is a low resolution, full page scan.

9. The method of claim 1 where first scan is not saved to non-volatile memory.

10. A method of scanning, comprising:
   turning on a lamp;
   scanning a first time at a low resolution, where the first scan is started before the lamp is stabilized;
   correcting the low resolution scan for lamp warm-up variations;
   displaying the corrected low resolution scan;
   allowing the lamp to stabilize;
   after displaying the corrected low resolution scan and after the lamp has stabilized, scanning a second time.

11. The method of claim 10 where the lamp Is stabilized by allowing a minimum time to pass.

12. The method of claim 10 where the lamp is considered stabilized when the power to the lamp needed to produce a predetermined light output level changes less than a threshold amount over a given time.

13. The method of claim 10 where the lamp is considered stabilized when the intensity profile of the lamp along the lamp axis changes less than a threshold amount over a given time.

14. The method of claim 10 where the low resolution scan is corrected for lamp intensity variations between each scan line.

15. The method of claim 10 where the low resolution scan is corrected for lamp intensity variations along the length of the lamp.

16. The method of claim 15 where the intensity variations along the lamp are estimated using a model.

17. A scanning system comprising
   a lamp to illuminate a scan area;
   a processor to control the scanning system to:
      turn on the lamp;
      scan a first time at a low resolution, where the first scan is started before the lamp is stabilized;
      correct the low resolution scan for lamp warm-up variations;
      display the corrected low resolution scan;
      allow the lamp to stabilize;
      after displaying the corrected low resolution scan and after the lamp has stabilized, scan a second time.

* * * * *

UNITED STATES PATENT AND TRADEMARK OFFICE
CERTIFICATE OF CORRECTION

| | | |
|---|---|---|
| PATENT NO. | : 7,312,905 B2 | |
| APPLICATION NO. | : 10/272139 | |
| DATED | : December 25, 2007 | |
| INVENTOR(S) | : John M. Baron et al. | |

It is certified that error appears in the above-identified patent and that said Letters Patent is hereby corrected as shown below:

In column 5, line 32, in Claim 11, delete "Is" and insert -- is --, therefor.

In column 6, line 18, in Claim 17, after "comprising" insert -- : --.

Signed and Sealed this

Sixth Day of December, 2011

David J. Kappos
*Director of the United States Patent and Trademark Office*